United States Patent [19]
Kishimoto et al.

[11] 3,915,126
[45] Oct. 28, 1975

[54] ROTARY INTERNAL COMBUSTION ENGINE

[75] Inventors: Kyuji Kishimoto; Hiroshi Takeuchi; Koreo Iwasa, all of Tokyo, Japan

[73] Assignee: Nissan Motor Company Limited, Yokohama, Japan

[22] Filed: Mar. 25, 1974

[21] Appl. No.: 454,781

[30] Foreign Application Priority Data
Mar. 26, 1973 Japan............................ 48-34369

[52] U.S. Cl. ............................................. 123/8.13
[51] Int. Cl.² .......................................... F02B 53/10
[58] Field of Search........................... 123/8.13, 8.45

[56] References Cited
UNITED STATES PATENTS
| | | | |
|---|---|---|---|
| 3,136,302 | 6/1964 | Nallinger et al. | 123/8.13 |
| 3,780,707 | 12/1973 | Cole | 123/8.45 X |

*Primary Examiner*—C. J. Husar
*Assistant Examiner*—Michael Koczo, Jr.

[57] ABSTRACT

The main fuel mixture is supplied by a lean-set carburetor, and a secondary fuel mixture is supplied by a rich-set carburetor and fed into a working chamber during the end of the intake phase to promote flame front propogation. A check valve prevents reverse flow through the secondary fuel mixture carburetor.

15 Claims, 16 Drawing Figures

ROTARY INTERNAL COMBUSTION ENGINE

The present invention relates to a rotary internal combustion engine, and is particularly useful in connection with rotary internal combustion engines of the following type.

Such a rotary combustion engine comprises an outer body having a cavity therein and an inner body disposed within the cavity, the inner body being rotatable relative to the outer body about the axis of the cavity and an eccentric axis parallel to the axis of the cavity. The outer body has axially-spaced end walls and a peripheral wall interconnecting the end walls to form the cavity, the inner surface of the peripheral wall having a multilobed profile which is preferably an epitrochoid. The inner body has end faces disposed adjacent to the outer body end walls for sealing cooperation therewith, and has a peripheral surface with a plurality of circumferentially-spaced apexes, each apex bearing a radially movable seal for sealing engagement with the inner surface of the peripheral wall to form a plurality of working chambers which vary in volume on relative rotation of the two bodies. Each such apex seal extends in an axial direction from one end face to the other of the inner body. The number of apexes will usually exceed the number of lobes of the epitrochoid by one.

In the following description it will be assumed that the inner body is rotary and the outer body is stationary. Accordingly, the inner body will be referred to as the rotor or rotary piston and the outer body as the housing. It will be understood, however, that the present invention is equally applicable to situations wherein the housing is rotary and the inner body stationary, or where both bodies may be rotatable.

In a rotary internal combustion engine of the type above, fuel in the area of a trailing piston apex can be ignited only with difficulty because the flame front does not propagate well to the trailing piston apex since the surface-to-volume ratio (S/V ratio) in the apex is higher, as compared to that near the leading piston apex, thus causing quenching of the flame front. Hence, hydrocarbon and carbon monoxide concentrations in exhaust gas from the rotary internal combustion engine are comparably higher than conventional reciprocatory internal combustion engines. Fuel consumption is also higher because a relatively rich air-fuel mixture is required to ensure stable performance of the rotary internal combustion engine. In order to eliminate these drawbacks encountered during the operation of a rotary internal combustion engine of the abovementioned type, the present invention aims at stratification of the fuel charge to ensure that a rich air-fuel mixture portion of the charge is present in the neighbourhood of the actual point or points of ignition.

It is an object of the present invention to provide an intake system suitable for stratification of the fuel charge.

This and further objects, features and advantages of the present invention will be more fully understood from the following specification in connection with the accompanying drawings, in which.

Figure 1:
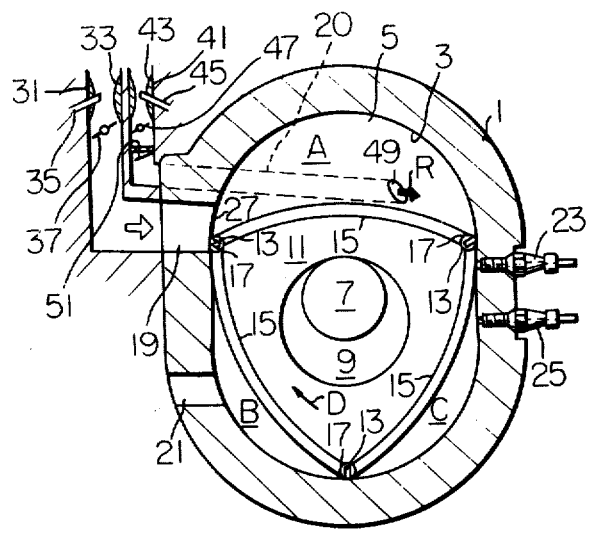
FIG. 1 is a cross-section of a rotary internal combustion engine embodying the invention.

Referring first to FIG. 1, a reference numeral 1 designates the peripheral wall of a rotary internal combustion engine whose inner surface 3 is in the form of a two-lobed epitrochoid. The peripheral wall 1 interconnects axially-spaced end walls, one of which is shown and designated as 5, to form a cavity which is penetrated by shaft 7 to which is fixed an eccentric 9. A rotor 11 is rotatably supported on the eccentric 9 and comprises three circumferentially-spaced apex portions each carrying a radially-movable apex seal 13 for sealing engagement with the inner surface 3 of peripheral wall 1 to form three variable volume working chambers A, B and C. The direction of rotation of the rotor 11 is designated by an arrow D. The end faces of the rotor 11 are provided with axially-movable side seals 15 extending between adjacent seals 13. An axially-movable seal pin 17 is provided between each end of the seals 13 and the adjacent ends of the side seals 15 for sealing engagement therewith. The ratio between the speed of the rotor and the speed of the shaft is 1 : 3, i.e. for each complete revolution of the rotor 11 about its axis, the shaft 7 performs three revolutions about its axis.

Through the peripheral wall 1 is formed a main or primary induction passageway or channel 19 and an exhaust channel 21, and two spark plugs 23 and 25 are provided that the four phase cycle is performed in each working chamber during each complete revolution of the rotor 11. The main intake channel 19 terminates in a main or primary induction port 27 through the inner surface 3, which is valved by the apexes of the rotor 11. A main induction port 29 can be arranged through an end wall 5 of the housing as is shown in FIG. 2.

In the embodiment of the invention shown in FIG. 1, the induction channel 19 is connected to a lean set carburetor 31 which is provided in the usual manner with a venturi 33, a jet 35 and a throttle flap 37. Fuel is supplied through the jet 35. The induction channel 19 may be connected to an air cleaner (not shown). A relatively lean air-fuel or primary combustible mixture is drawn through the channel 19 by suction, the amount being regulated by the setting of the throttle flap 37. A relatively rich air-fuel or secondary combustible mixture is drawn in through an auxiliary or secondary induction passageway or chananel 20, and for this purpose an auxiliary or secondary induction passageway or channel 20 is connected to a rich set carburetor 41 which is provided with a venturi 43, a jet 45 and a throttle flap 47. The amount of relatively rich mixture is regulated by the setting of throttle flap 47. The throttle flaps 37 and 47 are operated by an accelerator pedal (not shown). In accordance with the present invention, the auxiliary induction channel 20 terminates in an auxiliary or secondary induction port 49, which is formed at such a location that it is valved or uncovered by the rotor 11 during the end portion of the intake phase of a working chamber and the beginning portion of the compression phase of the working chamber. A one-way or check valve such as a reed valve 51 is disposed in the auxiliary induction channel 20 to prevent flow of fuel charge therethrough during the initial portion of the compression phase. The auxiliary induction channel 20 is so constructed and arranged as to direct the relatively rich fuel mixture toward the leading piston apex of a chamber in the direction of an arrow R. The reed valve 51 in the auxiliary induction channel 20 will be opened by suction in a working chamber during the last portion of the intake phase, but closed by positive pressure in the chamber during the initial portion of the compression phase, thus preventing reverse flow of fuel charge through the auxiliary induction channel 20 and the reed valve 51. The auxiliary induction channel 20 opens through the end wall 5, and terminates in the auxiliary induction port 49 through the inner surface of the end wall 5. The auxiliary induction channel can be formed through the peripheral wall 1, and its terminating induction port can be arranged through the inner surface of the peripheral wall 1 as illustrated in FIGS. 9 and 10.

Figure 2:
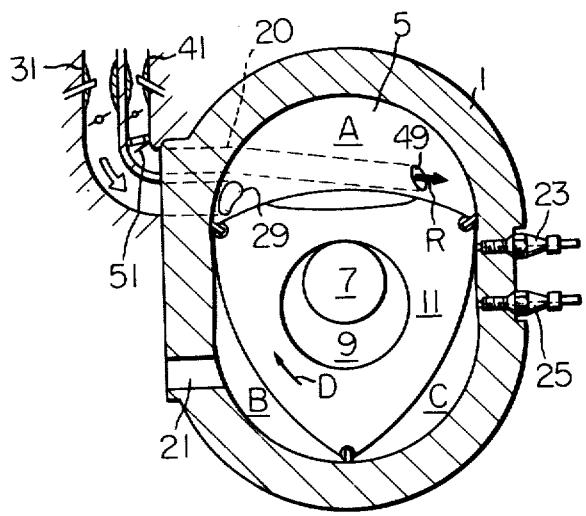
FIG. 2 is a view similar to FIG. 1 showing a a modification of the engine of FIG. 1.

The embodiment shown in FIG. 2 is the same as FIG. 1 as regards the auxiliary induction channel 20 and the auxiliary induction port 49. However, the main induction port is formed through the inner surface of the end wall 5 and is designated as 29, as will be readily understood from FIG. 2 of the drawings.

Figure 9:
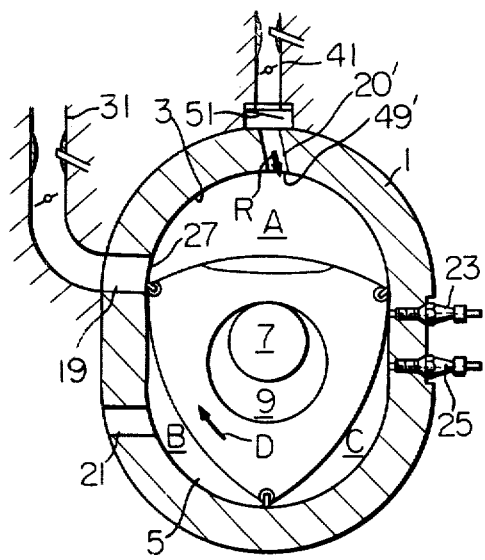
FIG. 9 is a view similar to FIG. 1 showing a further modification of the invention.

In the embodiment of FIG. 9, an auxiliary induction channel 20' is formed through the peripheral wall 1, and terminates in an auxiliary induction port 49' formed through the inner surface 3 of the peripheral wall 1. Of course, the location of the auxiliary induction port 49' relative to the phase position of the rotor 11 is substantially analogous to FIG. 1 or 2. It is preferable that the auxiliary induction port 49' be formed at a position in the vicinity of the major axis (not shown) of the epitrochoid. However, it is possible to locate the auxiliary induction port 49' slightly spaced from the major axis opposite to the direction of rotation of the rotor 11 within the area of the inner surface 3 of the peripheral wall 1 which is covered by the rotor 11 during the initial portion of the compression phase for the purpose of supplying rich air-fuel mixture directly into the leading piston apex region of the working chamber.

Figure 10:
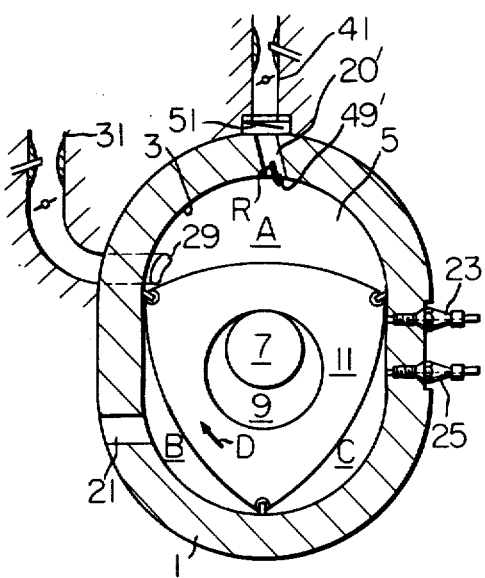
FIG. 10 is a view similar to FIG. 9, showing a modification of FIG. 9.
Figure 11:
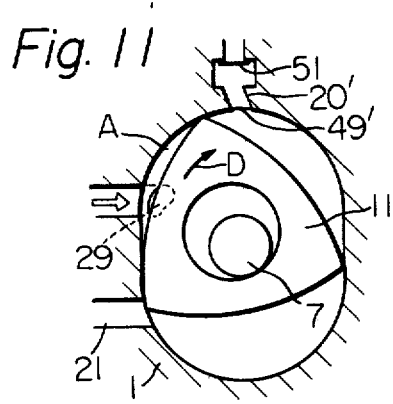
FIGS. 11-16 are views similar to FIGS. 3-8, illustrating the rotor-intake port relationship of the engine of FIG. 10 in different positions of the rotor.
Figure 12:
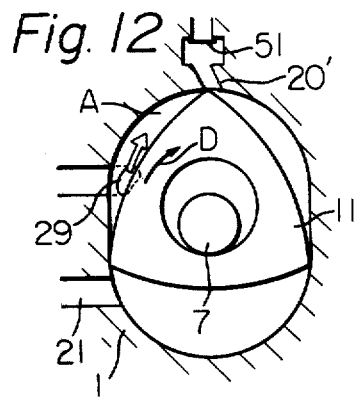
Figure 13:
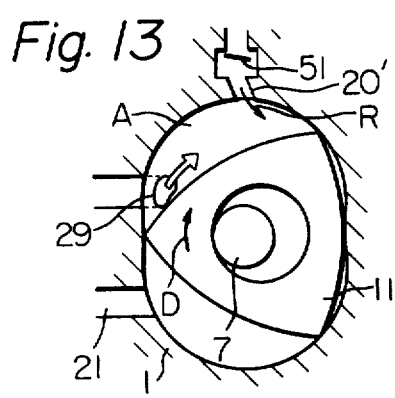
Figure 14:
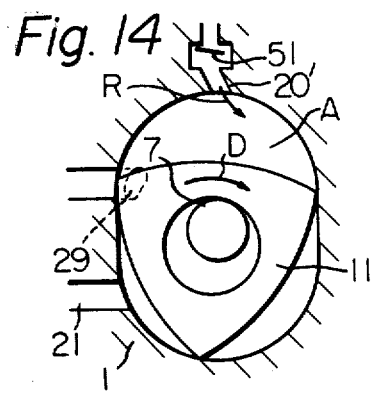
Figure 15:
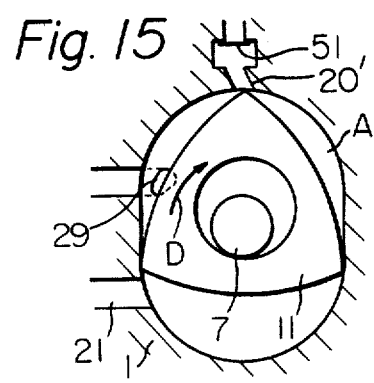
Figure 16:
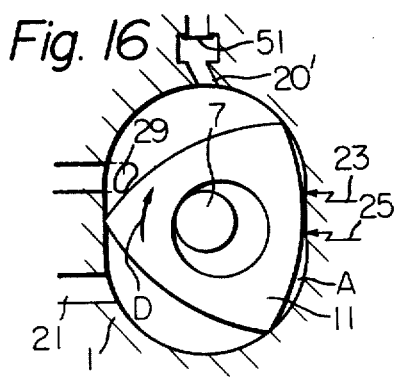

The embodiment of FIG. 10 is the same as regards the auxiliary induction channel 20' and the auxiliary induction port 49'. However, the main induction port is formed through the inner surface of the end wall 5 and designated as 29.

Figure 3:
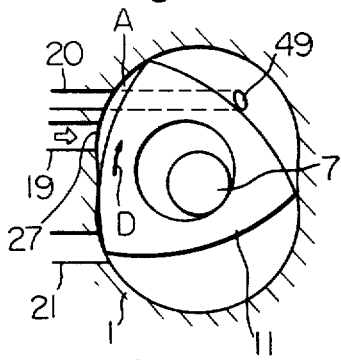
FIGS. 3-8 are diagrammatic views similar to FIG. 1 illustrating the rotor-intake port relationship of the engine in different positions of the rotor.
Figure 4:
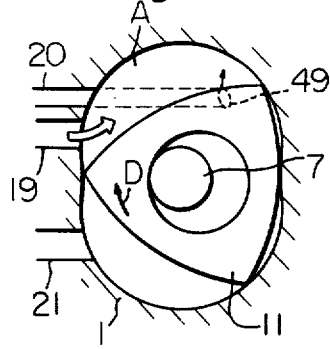
Figure 5:
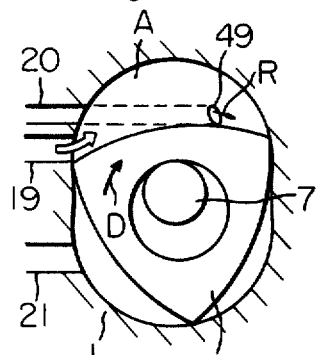
Figure 6:
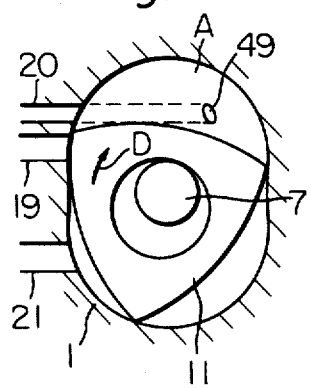
Figure 7:
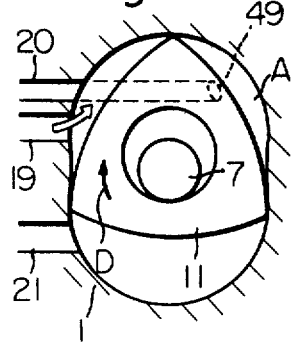

Referring now to FIGS. 3–8, FIG. 3 represents the position of the rotor 11 corresponding to the initial portion of the intake phase of the working chamber A. In FIG. 3, the main induction port 27 is open to the working chamber A, and a relatively lean air-fuel mixture or air is sucked thereinto during the operating cycle of the engine. FIG. 4 depicts the position of the rotor 11 in which the rotor 11 is about to uncover the auxiliary induction port 49, and the working chamber A is about to enter the last portion of the intake phase. In this position, the volume of the working chamber A approaches maximum. During further movement of the rotor 11 clockwise as viewed in FIGS. 3–8 from the position of the rotor 11 of FIG. 4 to the position of the rotor 11 of FIG. 6, the auxiliary intake port 49 is open to the working chamber A which performs the last portion of the intake phase. A relatively rich air-fuel mixture is sucked into the working chamber A through the valve 51 (see FIG. 6), which is open due to suction in the working chamber A. A rich airfuel mixture will be regionally located in the leading piston apex area since it is directed toward the leading piston apex as it passes through the auxiliary induction port 49 (see FIG. 1). During further movement of the rotor 11 from the position of FIG. 6 to FIG. 7, the auxiliary induction port 49 is still uncovered by the rotor 11 and is open to the working chamber A which performs the initial portion of the compression phase. During this period, the valve 51 is closed due to positive pressure in the chamber A, preventing entry of fuel charge into the auxiliary induction channel 20. In practical operation of the engine, the positive pressure in the chamber A during the initial portion of the compression phase is relatively low, approximately 5kg/cm$^2$. Thus, a reed valve 51 of simple construction will suffice the requirement. With the provision of the reed valve 51 the working chamber A is sealed off from the carburetor 41 although the auxiliary induction portion 49 is uncovered.

Figure 8:
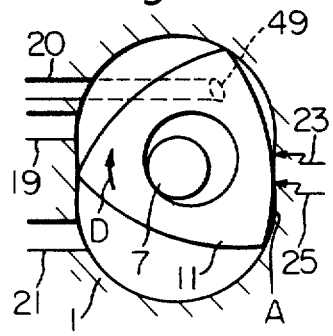

Rich air-fuel mixture located in the area near the leading piston apex during the intake phase of the working chamber A will occupy the same area relative to the housing during the last portion of the compression phase corresponding to the position of the rotor 11 of FIG. 8. Ignition will occur in the area which is filled with rich air-fuel mixture. It is preferable, therefore, that the leading spark plug 25 should be located in a position past the minor axis (not shown) of the epitrochoid in the direction of rotation of the rotor 11, and a spark be provided at the position of the rotor 11 of FIG. 8. To ensure combustion in the trailing piston apex area wherein a relatively lead air-fuel mixture is disposed, a trailing spark plug 23 may be located, if desired, in a position in front of but adjacent to the minor axis of the epitrochoid to provide a retarded spark.

Although the above description is directed to the engine shown in FIG. 1, the same is equally applied to the engine shown in FIG. 2, since the main induction port 29 formed through the end wall 5 is considered to produce the same results as that of FIG. 1.

Referring now to FIGS. 11–16, the operation of the engine shown in FIG. 10 will be briefly described. It will be observed that during the last portion of the intake phase of the working chamber A (during movement of the rotor 11 from the position of FIG. 12 to the position of FIG. 14), the reed valve 51 is opened and a relatively rich air-fuel mixture is sucked into the working chamber A through the auxiliary induction port 20'. The mixture is directed toward the leading piston apex since the auxiliary induction channel 20' has its terminal port 49' opening forwardly in the direction of rotation of the rotor 11. It will also be observed that the reed valve 51 is closed during the initial portion of the compression phase of the working chamber A (during movement of the rotor 11 from the position of FIG. 14 to the position of FIG. 15).

The above explanation of operation is equally applied to the engine illustrated in FIG. 9.

From the preceding description, it will be appreciated that in accordance with the present invention, a relatively rich air-fuel mixture is assured within the area near the leading piston apex with an auxiliary induction port formed through the outer body that opens into a working chamber when the working chamber performs the last portion of its intake phase and the initial portion of the compression phase. It will be noted that the check valve provided in the auxiliary induction channel prevents reverse flow of fuel charge therethrough, and rich air-fuel mixture is directed toward the leading piston apex as it flows into the chamber through the auxiliary induction port.

It will also be appreciated that the possibility of dilution or dissipation of rich air-fuel mixture in the chamber undergoing compression is minimized since the rich air-fuel mixture is sucked thereinto during the last portion of the intake phase only. Thus, stable ignition and satisfactory operation are possible with a relatively lean fuel charge.

It will be thus understood that with the present invention, the concentration of unburnt gases is remarkably reduced, and the thermal efficiency of the rotary internal combustion engine is improved.

What is claimed is:

1. A rotary internal combustion engine, comprising an outer body having a cavity therein having an axis; an inner body disposed within said cavity and rotatable relative to said outer body about an axis spaced from but parallel to said cavity axis; said outer body having axially spaced end walls and a peripheral wall interconnecting said end walls to form said cavity, the inner surface of said peripheral wall having a multi-lobed profile which is basically an epitrochoid; said inner body having end faces disposed adjacent to said end walls for sealing cooperation therewith and having a peripheral surface with a plurality of circumferentially-spaced apex portions; an apex seal member carried by each of said apex portions and engaging the inner surface of said peripheral wall in sealing relation to form a plurality of working chambers between the two bodies which vary in volume upon relative rotation of the two bodies; said outer body having a main intake port opening into said cavity and having a main intake channel communicating with said main intake port, said outer body also having an auxiliary intake port opening into said cavity and having an auxiliary intake channel communicating with said auxiliary intake port and having an obstruction device therein operative to prevent entry of charge from said cavity to said auxiliary intake channel, said auxiliary intake port being so disposed in said outer body that said auxiliary intake port is open to a working chamber during the operating cycle when the working chamber performs the last portion of the intake stroke and the initial portion of the compression stroke, said auxiliary intake channel being directed toward the leading portion of the working chamber; a rich set carburetor which communicates with said auxiliary intake channel at upstream of said obstruction device with respect to the direction of flow in said auxiliary intake channel during the operating cycle; and a lean set carburetor which communicates with said main intake channel.

2. A rotary internal combustion engine as claimed in claim 1, wherein said auxiliary intake port is disposed in the end wall of said outer body.

3. A rotary internal combustion engine as claimed in claim 2, wherein said main intake port is disposed in the end wall of said outer body.

4. A rotary internal combustion engine as claimed in claim 2, wherein said main intake port is disposed in the peripheral wall of said outer body.

5. A rotary internal combustion engine as claimed in claim 1, wherein said auxiliary intake port is disposed in a peripheral wall of said outer body.

6. A rotary internal combustion engine as claimed in claim 5, wherein said auxiliary intake port is located in the vicinity of the major axis of the epitrochoid in the direction of rotation of said inner body relative to said outer body.

7. A rotary piston internal combustion engine as claimed in claim 6, wherein said auxiliary intake port is disposed in an advanced position after the major axis of the epitrochoid in the direction of rotation of said inner body relative to said outer body.

8. A rotary internal combustion engine including a housing having two end walls, the inner peripheral surface of the housing and the two end walls defining therebetween a cavity of epitrochoidal section, a multi-lobed rotor sealingly engaging with the peripheral surface and the end walls and being simultaneously rotatable about the axis of the epitrochoid and an eccentric axis parallel thereto to define within the cavity working chambers of varying volume, the operating phases of induction, compression, combustive expansion and exhaust of a primary combustible mixture being sequentially performed in each working chamber, and primary induction means for supplying primary combustible mixture into each working chamber during the induction phase thereof, said engine comprising:

a secondary induction means for supplying a secondary combustible mixture which has an air-fuel ratio lower than that of the primary combustible mixture into each working chamber, including secondary combustible mixture supply means, a secondary induction passageway communicating said secondary mixture supply means with the cavity at a secondary induction port located so as to be valved by the rotor to open into each working chamber during the end portion of the induction phase and the beginning portion of the compression phase thereof, and a one-way valve disposed in said passageway operative to allow communication therethrough only when the pressure at the end of said valve facing said secondary mixture supply means is greater than the pressure at the end of said valve facing the cavity, whereby said secondary induction port is arranged so that said secondary combustible mixture is directed therefrom into each working chamber toward the leading portion of the working chamber in the direction of rotation of the rotor.

9. An engine as claimed in claim 8, in which the primary induction means includes a lean-set carburetor and a primary induction passageway communicating with the cavity therefrom through a primary induction port, and in which said secondary combustible mixture supply means comprises a rich-set carburetor.

10. An engine as claimed in claim 9, in which the primary induction port opens into the cavity through the inner peripheral surface of the housing.

11. An engine as claimed in claim 9, in which the primary induction port opens into the cavity through an end wall of the housing.

12. An engine as claimed in claim 9, in which said secondary induction port opens into the cavity through the inner peripheral surface of the housing.

13. An engine as claimed in claim 9, in which said secondary induction port opens into the cavity through an end wall of the housing.

14. An engine as claimed in claim 12, in which said secondary induction port opens into the cavity in the vicinity of the major axis of the cavity.

15. An engine as claimed in claim 14, in which said secondary induction port opens into the cavity at a location spaced from the major axis of the cavity in the direction opposite to the direction of rotation of the rotor.

* * * * *